United States Patent [19]

Dey

[11] 4,184,014

[45] Jan. 15, 1980

[54] ABUSE RESISTANT CELLS CONTAINING FLUID DEPOLARIZERS

[75] Inventor: Arabinda N. Dey, Needham, Mass.

[73] Assignee: P. R. Mallory & Co. Inc., Indianapolis, Ind.

[21] Appl. No.: 963,657

[22] Filed: Nov. 24, 1978

[51] Int. Cl.² .............................................. H01M 4/36
[52] U.S. Cl. ..................................... 429/105; 429/196
[58] Field of Search ................ 429/105, 196, 194, 197

[56] References Cited

U.S. PATENT DOCUMENTS

| | | | |
|---|---|---|---|
| 4,012,564 | 3/1977 | Auborn | 429/196 X |
| 4,093,784 | 6/1978 | Driscoll | 429/105 X |
| 4,115,629 | 9/1978 | Dey et al. | 429/56 |

Primary Examiner—Charles F. LeFevour

Attorney, Agent, or Firm—Ronald S. Cornell; Israel Nissenbaum; Martin M. Glazer

[57] ABSTRACT

Abuse resistant electrochemical cells having consumable fluid depolarizer/electrolyte solvents, active metal anodes and inactive conductive cathodes which are made resistant to abusive forced discharge or cell reversal conditions by maintaining excess portions of both the fluid depolarizer/electrolyte solvent with electrolyte and the active metal anode at the end of cell discharge. The remaining portion of the active metal is electrically connected to the negative terminal of the cell and substantially faces the entire surface of the originally adjacent inactive cathode. The remaining portion of the fluid depolarizer/electrolyte solvent is sufficient for maintaining electrical and thermal conductivity whereby heat concentration is prevented.

11 Claims, No Drawings

ABUSE RESISTANT CELLS CONTAINING FLUID DEPOLARIZERS

The invention herein described was made in the course of or under a contract with the Department of the Army.

This invention relates to high energy density electrochemical cells having consumable fluid depolarizer/electrolyte solvents and active metal anodes and in particular to those cells having thionyl chloride ($SOCl_2$) depolarizer/electrolyte solvents and lithium anodes.

One of the most desirable high energy density electrochemical cell couples developed to date has been that of lithium/thionyl chloride as anode and cathode depolarizer respectively with the thionyl chloride further functioning as the electrolyte salt solvent. Cells containing the lithium/thionyl chloride couple have been found to provide stable high voltages (3.6 volts) under varying temperature and discharge conditions. Furthermore such cells do not generally contain organic components and are, as a result, exceedingly stable under lengthy storage conditions even under widely varying temperature conditions. However, despite the numerous advantages, the lithium/thionyl chloride cells suffer from a key disadvantage which has prevented their widespread use. Under varying abuse conditions such as short circuiting, forced discharge and cell reversal, cells containing thionyl chloride have a marked tendency to violently explode. As a result, a great deal of effort has been recently expended in ensuring the safety of thionyl chloride cells. In U.S. Pat. No. 4,115,629 and U.S. Pat. application Ser. No. 875,054, filed on Feb. 3, 1978, the use of low pressure venting (thionyl chloride cells are substantially unpressurized) is described as being an effective means in preventing chemical reactions within thionyl chloride cells which may lead to cell explosions. However, such low pressure venting has been found to be effective only under abuse conditions such as cell shorting and not generally effective under conditions of forced discharge or cell reversal.

The problem of forced discharge or cell reversal is a common one found in multiple cell batteries containing one or more defective or discharged cells in conjunction with good cells. In the past, in order to obviate such problems it has been the practice to either use cells individually or to provide cells arranged in batteries with proper diodes. Despite the admitted effectiveness of such expedients there are certain drawbacks. The use of individual cells obviously limits the utility of such cells to relatively low voltage applications. The inclusion of diodes necessitates the use of additional expensive components with possible lost volumetric capacity engendered by such components and housings therefor.

It is an object of the present invention to provide a means for preventing cell explosion or other untoward effects of forced discharge or cell reversal conditions in a cell or cells without the utilization of additional components.

It is a further object of the present invention to provide cells which are resistant to forced discharge or cell reversal conditions and which contain consumable fluid depolarizer/electrolyte solvents such as thionyl chloride normally subject to explosion under such conditions.

These and other objects, features and advantages of the present invention will become more evident from the following discussion.

Generally the present invention comprises electrochemical cells containing consumable fluid depolarizer/electrolyte solvents, active metal anodes and inactive conductive cathodes. Each cell is constructed such that an electrical and heat conductive portion of the consumable fluid depolarizer/electrolyte solvent with electrolyte salt and an electrically terminal connected portion of anode metal remain at the end of cell discharge. The remaining anode metal should also remain substantially facing the originally adjacent inactive conductive cathode and the remaining fluid depolarizer/electrolyte solvent with dissolved electrolyte salt should conductively wet a substantial portion of the remaining electrodes. The construction of such cell with excess of both active electrode materials is in contradiction to normal prior art procedure wherein it has generally been the accepted practice to utilize one of the active electrode materials of a cell as a limiting factor of cell life with the end of cell discharge being determined by the consumption of such material.

The cause of explosions of abused thionyl chloride cells has been the subject of much recent inquiry and speculation, without a positive determination of the actual cause or causes thereof. Nevertheless the above described cell construction has been found to be effective in controlling the explosive consequences of forced discharged thionyl chloride cells. Based upon the efficacy of the cell construction described, it is postulated that the cause of the explosions results from localized concentration of heat to critical temperature in "hot spots" within the cells. It is theorized that by initially providing sufficient fluid depolarizer/electrolyte solvent, such that at the end of cell discharge the remaining electrolyte solution provides sufficiently uniform current and heat conduction, localization of heat is prevented. The normal loss of sufficiently uniform conductivity of the electrolyte solution results from the dual function of the fluid depolarizer/electrolyte solvent whereby the fluid depolarizer/electrolyte solvent is depleted by the cell reaction. This depletion results in a reduction of the volume of the electrolyte solution and, depending upon initial concentration, saturation of the solvent with possible electrolyte salt precipitation. The reduced volume of the electrolyte solution results in segments of the electrodes drying up and the precipitation of the electrolyte salt engenders a non-conductive species between portions of the electrodes. The dried segments of the electrodes cannot carry the current of the forced discharge without high resistance. Accordingly, the remaining segments of the electrodes carry excess current and become overloaded with the formation of the aforementioned "hot spots." Similarly the precipitation of the electrolyte salt between portions of electrodes effectively shunts the current between other portions of the electrodes also leading to the formation of "hot spots." Furthermore in some instances, saturation of the electrolyte solvent itself tends to reduce the conductivity of the solution to a level whereby there is not sufficient conductivity for efficient current and heat transfer. The resistance of the electrolyte solution thereby causes heat buildup and cell explosion. Accordingly, to prevent such occurrence the amount of the initially provided fluid depolarizer/electrolyte solvent must be sufficient such that at the end of discharge the remaining electrolyte solution wets a substantial portion of the electrodes such that "hot spots" are not created. Furthermore the amount of fluid depolarizer/electrolyte solvent remaining should be sufficient to maintain conductivity of the electrolyte solution with efficient transfer of current and heat without substantial precipitation of the electrolyte salt.

In addition to the excess conductive electrolyte solution there must also be an excess amount of anode metal such as lithium, whereby upon the completion of cell discharge and under conditions of forced discharge there remains a counter electrode for the plating of the anode metal ions such as lithium on the inactive conductive cathode. By maintaining such counter electrode with anode metal deposition on the cathode, heating of the cell surprisingly does not occur. The remaining anode material must remain electrically in contact with the negative terminal of the cell in order that such remaining material can function as a counter electrode. Additionally the remaining material must substantially face the entire initially facing surface of the inactive conductive cathode. Should the anode material be eroded in portions which initially faced the inactive conductive cathode, such initially facing portion of the cathode will not plate anode metal ions thereon. As a result, the induced current of the forced discharge will be concentrated in the remaining anode metal-facing areas of the cathode whereupon sufficient current concentration in localized areas will also cause a heat rise leading ineluctably to cell explosion.

In order to maintain both electrical continuity between remaining anode material and to ensure that fragmentation or uneven utilization of the anode material does not occur to any detrimental extent, large excesses of the anode metal may be utilized, however, it is preferred that smaller amounts of anode material be used in conjunction with a conductive substrate.

It has also been surprisingly discovered that despite long periods of forced discharge the anode material, if present in sufficient excess, as above described, will not be totally depleted. It is postulated that such occurrence results from an internal short circuiting mechanism whereby the plated anode metal on the conductive cathode is in the form of dendrites and that a point is reached during such forced plating whereby a direct conductive path is formed within the cell between anode and cathode. The entire cell thereafter becomes a conductive member wherein further forced discharging does not engender any resistance therein with heat evolution being avoided thereby.

The most preferred means of ensuring that both the consumable fluid depolarizer/electrolyte solvent and the anode metal remain in sufficient excess even after the cell is totally discharged is by limiting the inactive conductive cathode itself. In thionyl chloride and other fluid depolarized cells the cathode generally comprises activated carbon (or other high surface area conductive material such as graphite) usually admixed with a binder such as Teflon pasted upon a conductive metallic substrate. Since the cell reaction generally takes place upon such carbon cathode, limiting the reaction sites available in the cathode limits the dischargeable life of the cell. Such limitation can be easily effected by controlling either the amount of carbon in the cathode or the degree of activation of the carbon (surface area available for reaction). Though the carbon cathode is limited with respect to the normal cell reaction it is however not limited with respect to the forced discharge dendritic plating of the anode metal thereon. As a result of the high degree of porosity of the carbon cathode the conductive metallic substrate remains available for such dendritic plating.

The reaction capacity of the carbon electrode is based upon the weight of the carbon contained therein and the apparent surface area of the carbon. This capacity can be generally empirically determined for varying compositions and concentrations of electrolyte solutions by considerations of the reaction products and their amounts which precipitate upon the electrode and passivate it. For example, in cells containing lithium anodes and thionyl chloride depolarizer/electrolyte solvents the cell reaction is postulated as:

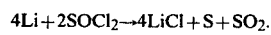

$$4Li + 2SOCl_2 \rightarrow 4LiCl + S + SO_2.$$

A determination of the amount of the reaction products LiCl and S(SO$_2$ is not a solid), on the carbon cathode of a discharged cell provides the intrinsic capacity of the carbon in such cells. It has, for example, been determined that for 0.5 and 1.0 molar electrolyte solutions of lithium tetrachloroaluminate (LiAlCl$_4$) in thionyl chloride the maximum capacity of carbon is about 3.28 and 2.65 Ahr/gm respectively.

Anode metals useful in the cells of the present invention include alkali and alkaline earth metals as well as other metals above hydrogen in the EMF series. Such anode metals specifically include the aforementioned lithium, sodium, potassium, beryllium, magnesium, calcium and aluminum. In a determination of the amount of anode metal to be initially used in the cell whereby a sufficient excess remains at the end of cell discharge consideration should be given to the intrinsic capacity of the anode metal or metals and the minimum amount of such metal or metals required to maintain an electrically coherent electrode of similar initial areal dimensions. Thus, after a determination of the maximum carbon capacity, the amount of the anode metal initially used in a cell should exceed the capacity of the cathode by an amount such that the anode is thinned by the cell reaction without substantial loss of area opposing such cathode and without substantial loss of electrical continuity throughout the anode to the negative terminal of the cell. The utilization of a metallic substrate for the anode maintains such electrical continuity with lesser amounts of anode metal required and is accordingly a preferred embodiment.

The consumable fluid depolarizer/electrolyte solvents utilized in the cells of the present invention include the aforementioned thionyl chloride and other fluid oxyhalides, nonmetallic oxides, nonmetallic halides and mixtures thereof such as phosphorous oxychloride (POCl$_3$), selenium oxychloride (SeOCl$_2$), sulfur dioxide (SO$_2$), sulfur trioxide (SO$_3$), vanadium oxytrichloride (VOCl$_3$), chromyl chloride (CrO$_2$Cl$_2$), sulfuric oxychloride (SO$_2$Cl$_2$), nitryl chloride (NO$_2$Cl), nitrosyl chloride (NOCl), nitrogen dioxide (NO$_2$), sulfur monochloride (S$_2$Cl$_2$) and sulfur monobromide (S$_2$Br$_2$). Each of the above can be used together with thionyl chloride (SOCl$_2$) as electrolyte solvent/cathode depolarizer or separately. Additionally, the consumable fluid depolarizer/electrolyte solvents may be used in cells in conjunction with other non-aqueous solvents which do not also function as depolarizers. Generally such non-aqueous solvents include organic solvents such as propylene carbonate, acetonitrile, methyl formate, tetrahydrofuran and the like which have generally been used in non-aqueous high energy density lithium and lithium/SO₂ cells.

In a determination of the amount of fluid depolarizer/electrolyte solvent to be initially placed within the cell the capacity of such fluid depolarizer/electrolyte solvent should be balanced against the capacity of the carbon cathode. The excess fluid should be of sufficient volume whereby the remaining electrolyte solution would remain in electrical contact with or wet a sufficient amount of the electrodes capable of carrying a forced discharge current without heat evolution. Generally, the amount of electrolyte solution remaining should wet substantially all of both electrodes. The wetting may be of minimal amounts effected by means such as capillary action. As some guidance in a determination of amounts necessary for such complete electrolyte solution wetting, consideration should be given to electrolyte viscosity and surface tension thereof, cell electrode geometry such as spirally wound electrodes or plate electrodes and fluid distribution. Porosity and fluid path length within the electrodes should also be determined for individual cells in determining minimal amounts of electrolyte solution required for substantially complete capillary wetting. It is however preferred that for safety considerations especially with mass production of cells that clear excess amount of electrolyte solution remains at the end of cell discharge. Consideration must also be given to the conductivity of the electrolyte solution with the excess consumable fluid depolarizer/electrolyte solvent and electrolyte salt therein. Such conductivity should be capable of efficiently carrying the forced discharge current load without heat evolution. Generally the conductivity should not be less than about $10^{-3} \text{ohm}^{-1}\text{cm}^{-1}$ at room temperature in order to maintain such efficient current carrying capability.

In order to obviate the possibility of electrolyte salt precipitation with possible increased internal cell resistance after cell discharge and during forced discharge it is preferable that the concentration of the electrolyte salt in the initial electrolyte solution be sufficiently low such that after discharge and the consumption of a portion of the fluid depolarizer/electrolyte solvent, the solution does not reach the saturation concentration.

The electrolyte salt dissolved in the electrolyte solvent is determinative of the electrical conductivity within the cell during and after discharge (during forced discharge) thereof. The electrolyte salts useful in the cells of the present invention should generally have high conductivities and solubility within the electrolyte solvents and should, of course, be compatible with the cell components. Preferably the solvated electrolyte salt or salts used should provide a conductivity in excess of $10^{-2} \text{ohm}^{-1}\text{cm}^{-1}$ at room temperature. Examples of electrolyte salts having the requisite conductivities and compatability commonly used in cells containing fluid depolarizer/electrolyte solvents include alkali and alkaline earth metal halides, tetrahaloaluminates, tetrahaloborates, clovoborates, hexafluorophosphates, hexafluoroarsenates, perchlorates and other electrolyte salts or solutes enumerated in patents such as U.S. Pat. Nos. 3,926,669 and 4,020,240.

In order to more fully clarify the present invention, the following example is presented as illustrating a forced discharge abuse resistant Li/SOCl₂ cell which is carbon cathode limited whereby a sufficient excess of both thionyl chloride depolarizer/electrolyte solvent with electrolyte salt and lithium anode metal is ensured.

The example is for illustrative purposes only and should not be taken as limiting the present invention.

EXAMPLE

A cylindrical "D" size (OD 1.30" (3.12 cm), Ht. 2.375" (6.03 cm) cell is constructed by winding a Shawinigan Black carbon cathode (with 10% by weight Teflon binder) having the dimensions 20"(50.8 cm)×1.75" (4.44 cm)×0.020" (0.05 cm) and a lithium anode having the dimensions 22.5" (57.15 cm)×2" (5.08 cm)×0.020" (0.05 cm) with glass filter paper separators therebetween into a cylindrical stack. Expanded nickel current collectors are used for both the carbon cathode and lithium anode. The weight of the lithium is 7.3 grams and the weight of the carbon in the carbon cathode is 4.1 grams and the weight of the 1 M LiAlCl₄-SOCl₂ electrolyte solution is forty three grams. The maximum capacity of carbon in a 1 M LiAlCl₄-SOCl₂ electrolyte is 2.65 Ahr/gm and accordingly the capacity of the carbon cathode in the cell is 11 Ahr. The stoichiometric capacity of the thionyl chloride within the electrolyte is 17 Ahr based upon an energy density of 0.45 Ahr/gm of SOCl₂. The stoichiometric capacity of the lithium anode is about 28 Ahr based upon an energy density of lithium of about 3.86 Ahr/gm. With both the lithium anode and the thionyl chloride depolarizer present in such excess over the capacity of the carbon cathode the cell is discharged at 0.3 A and delivers 10 Ahr up to 2 volts. The cell is thereafter force discharged at 3 A for 18 hours. During this time the cell voltage is constant at −0.5 volts. The cell does not explode nor is there any significant rise in cell temperature during the reversal process.

Based upon the cell reaction

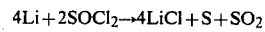

$$4Li + 2SOCl_2 \rightarrow 4LiCl + S + SO_2$$

about 22 grams of thionyl chloride and about 2.56 gms of lithium are consumed during the discharge. The remaining 21 grams of electrolyte solution remains sufficient to wet substantially all of both electrodes and is about a 2.5 molar solution of LiAlCl₄—SOCl₂. The saturation of SOCl₂ is in excess of 4 molar and accordingly there is no electrolyte salt precipitate. Furthermore, the 2.5 molar solution has a conductivity of about $1 \times 10^{-2} \text{ohm}^{-1}\text{cm}^{-1}$ at room temperature. The remaining 4.7 gms of lithium are substantially electrically connected throughout to the negative terminal of the cell via the nickel substrate therein. The dimensions of the remaining lithium are about 22.5" (57.15 cm)×1.75" (4.44 cm)×0.013" (0.033 cm). The initial thickness of the anode is reduced with the areal dimensions facing the carbon cathode being substantially unchanged.

The above example is for illustrative purposes only. It is understood that changes and variations with respect to the cell components and the relative amounts thereof may be made without departing from the scope of the present invention as defined in the following claims.

What is claimed is:

1. An abuse resistant electrochemical cell comprising an active metal anode selected from the group consisting of lithium, sodium, potassium, berylium, magnesium, calcium, and aluminum electrically connected to a terminal therefor, and an inactive conductive cathode, with said anode and cathode having surfaces thereof respectively which face each other, said cell further comprising a fluid depolarizer/electrolyte solvent selected group consisting of inorganic oxyhalides, inorganic thiohalides, nitrogen dioxide (NO$_2$), sulfur dioxide (SO$_2$), and sulfur trioxide (SO$_3$) with electrolyte salt dissolved therein with said anode and cathode being immersed in said fluid depolarizer, characterized in that said active metal anode and said fluid depolarizer/electrolyte solvent are each present in excess of the dischargeable capacity of said cell, with said excess active metal anode being of an amount sufficient such that a surface thereof remains substantially facing said initially facing surface of said cathode, with said excess active metal anode remaining electrically connected to said terminal; and said excess fluid depolarizer/electrolyte solvent being of an amount sufficient to substantially wet said excess anode and said cathode, whereby current may be conducted therethrough without heat concentration within said cell, and wherein said excess fluid depolarizer/electrolyte solvent contains sufficient electrolyte salt dissolved therein whereby said fluid depolarizer, with dissolved salt, retains a conductivity sufficiently high such that current may be carried therethrough without resistance heat buildup.

2. The cell of claim 1 wherein said inactive conductive cathode is determinative of said dischargeable capacity of said cell with the capacity of said inactive conductive cathode, based upon the number of cell reaction sites therein, being less than the capacity of each of said active metal anode and said fluid depolarizer.

3. The cell of claim 2 wherein said inactive conductive cathode comprises activated carbon on a conductive metallic substrate.

4. The cell of claim 3 wherein said conductivity is not less than $10^{-3}$ ohm$^{-1}$cm$^{-1}$.

5. The cell of claim 3 wherein said fluid depolarizer is selected from the group consisting of thionyl chloride (SOCl$_2$), phosphorous oxychloride (POCl$_3$), selenium oxychloride (SeOCl$_2$), sulfur dioxide (SO$_2$), sulfur trioxide (SO$_3$), vanadium oxytrichloride (VOCl$_3$), chromyl chloride (CrO$_2$Cl$_2$), sulfuric oxychloride (SO$_2$Cl$_2$), nitryl chloride ((NO$_2$Cl), nitrosyl chloride (NOCl), nitrogen dioxide (NO$_2$), sulfur monochloride (S$_2$Cl$_2$) and sulfur monobromide (S$_2$Br$_2$) and mixtures thereof.

6. The cell of claim 5 wherein said fluid depolarizer comprises thionyl chloride.

7. The cell of claim 6 wherein said electrolyte salt is lithium aluminum chloride and wherein said conductivity is not less than $10^{-3}$ ohm$^{-1}$cm$^{-1}$.

8. The cell of claim 6 wherein said active metal anode comprises lithium.

9. The cell of claim 8 wherein said active metal anode further includes a conductive metallic substrate.

10. The cell of claim 2 wherein said fluid depolarizer comprises thionyl chloride and said anode is lithium.

11. The cell of claim 1 wherein said fluid depolarizer comprises thiony choride.

* * * * *